US012639629B2

(12) United States Patent
Narita

(10) Patent No.: US 12,639,629 B2
(45) Date of Patent: May 26, 2026

(54) COMPUTER-READABLE RECORDING MEDIUM STORING DETERMINATION PROGRAM, DETERMINATION APPARATUS, AND DETERMINATION METHOD

(71) Applicant: Fujitsu Limited, Kawasaki (JP)

(72) Inventor: Kenichiroh Narita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 18/218,118

(22) Filed: Jul. 5, 2023

(65) Prior Publication Data

US 2024/0070536 A1 Feb. 29, 2024

(30) Foreign Application Priority Data

Aug. 23, 2022 (JP) ................................. 2022-132233

(51) Int. Cl.
*G06N 20/00* (2019.01)
*G06N 5/04* (2023.01)
(52) U.S. Cl.
CPC ............... *G06N 20/00* (2019.01); *G06N 5/04* (2013.01)
(58) Field of Classification Search
CPC ............. G06N 20/00; G06N 5/00; G06N 3/00
See application file for complete search history.

(56) References Cited

U.S. PATENT DOCUMENTS

2020/0320429 A1 10/2020 Jha et al.
2021/0287119 A1* 9/2021 Rink .................. G06Q 30/0201
(Continued)

FOREIGN PATENT DOCUMENTS

| EP | 4 287 083 A1 | 12/2023 |
| JP | 2021-012593 A | 2/2021 |
| JP | 2021-149842 A | 9/2021 |

OTHER PUBLICATIONS

Extended European Search Report issued Feb. 2, 2024 in corresponding European Patent Application No. 23183570.3, 12 pages.
(Continued)

*Primary Examiner* — Maryam A Nasri
(74) *Attorney, Agent, or Firm* — XSENSUS LLP

(57) ABSTRACT

A process includes processing first and third data based on a bias of the first and third data with reference to an attribute, respectively, updating a first machine-learning-model based on second data obtained by the processing of the first data, and generating a second machine-learning-model by the updating of the first machine-learning-model, obtaining prediction-results by inputting, to the second machine-learning-model, fourth data obtained by the processing of the third data, determining ground-truths of the fourth data by clustering features of the fourth data, determining accuracy of the second machine-learning-model based on the prediction-results and the ground-truths, identifying, based on a difference between the first and second data, the attribute processed with a processing-amount larger than a predetermined-threshold, identifying a contribution-magnitude of the attribute to an inference-result of the second machine-learning-model, and determining, based on the contribution-magnitude, an influence-degree when the second machine-learning-model is trained by the second data.

18 Claims, 15 Drawing Sheets t1: COPY OPERATION MODEL TO DETERMINATION APPARATUS 10 (FIRST TIME ONLY)
t2: EXECUTE FAIRNESS CORRECTION PROCESS ON INPUT DATA
t3: UPDATE CORRECTION MODEL BASED ON CORRECTION DATA
t4: DETERMINE ACCURACY INFLUENCE ON OPERATION MODEL BY USING CORRECTION MODEL
t5: DETERMINE INFLUENCE DEGREE IN A CASE WHERE CORRECTION MODEL IS TRAINED BY USING MODEL CONTRIBUTION DEGREE
t6: OUTPUT PREDICTION ACCURACY, FAIRNESS SCORE, AND MODEL INFLUENCE SCORE
t7: COPY CORRECTION MODEL TO OPERATION MODEL

(56) References Cited

U.S. PATENT DOCUMENTS

| | | |
|---|---|---|
| 2021/0295182 A1 | 9/2021 | Terashita et al. |
| 2021/0304063 A1 | 9/2021 | Bulut et al. |
| 2022/0129793 A1 | 4/2022 | Sato |

OTHER PUBLICATIONS

Kamiran et al: "Classifying without discriminating", Computer, Control and Communication, 2009. IC4 2009. 2nd International Conference on, IEEE, Piscataway, NJ, USA, Feb. 17, 2009 (Feb. 17, 2009), pp. 1-6, XP031452853, ISBN: 978-1-4244-3313-I.
Mehrabi et al: "A Survey on Bias and Fairness in Machine Learning", arxiv.org, Cornell University Library, 201 Olin Library Cornell University Ithaca, NY 14853, Jan. 25, 2022 (Jan. 25, 2022), XP091123947.
European Office Action issued Oct. 10, 2025 in corresponding European Patent Application No. 23 183 570.3, 10 pages.

* cited by examiner

FIG. 1

PROTECTED ATTRIBUTE

| No. | ATTRIBUTE A (GENDER) | ATTRIBUTE B | ATTRIBUTE C | ATTRIBUTE D | GROUND TRUTH | DETERMINATION RESULT |
|-----|---------------------|-------------|-------------|-------------|--------------|----------------------|
| 1 | MALE | 30 | 3 | 0.2 | A | B |
| 2 | MALE | 0 | 2 | 0.8 | B | A |
| 3 | FEMALE | 100 | 2 | 1.2 | A | B |
| 4 | FEMALE | 200 | 3 | 1.9 | B | A |
| 5 | MALE | 50 | 2 | 0.3 | B | B |
| 6 | MALE | 60 | 3 | 5.0 | A | A |

CORRECTION

| No. | ATTRIBUTE A (GENDER) | ATTRIBUTE B | ATTRIBUTE C | ATTRIBUTE D | GROUND TRUTH | DETERMINATION RESULT |
|-----|---------------------|-------------|-------------|-------------|--------------|----------------------|
| 1 | MALE | 0 | 3 | 0.5 | A | A |
| 2 | MALE | 0 | 2 | 0.8 | B | A |
| 3 | FEMALE | 100 | 2 | 1.2 | A | B |
| 4 | FEMALE | 200 | 1 | 1.9 | B | B |
| 5 | MALE | 100 | 2 | 1.2 | B | A |
| 6 | MALE | 60 | 3 | 5.0 | A | A |

FIG. 3A
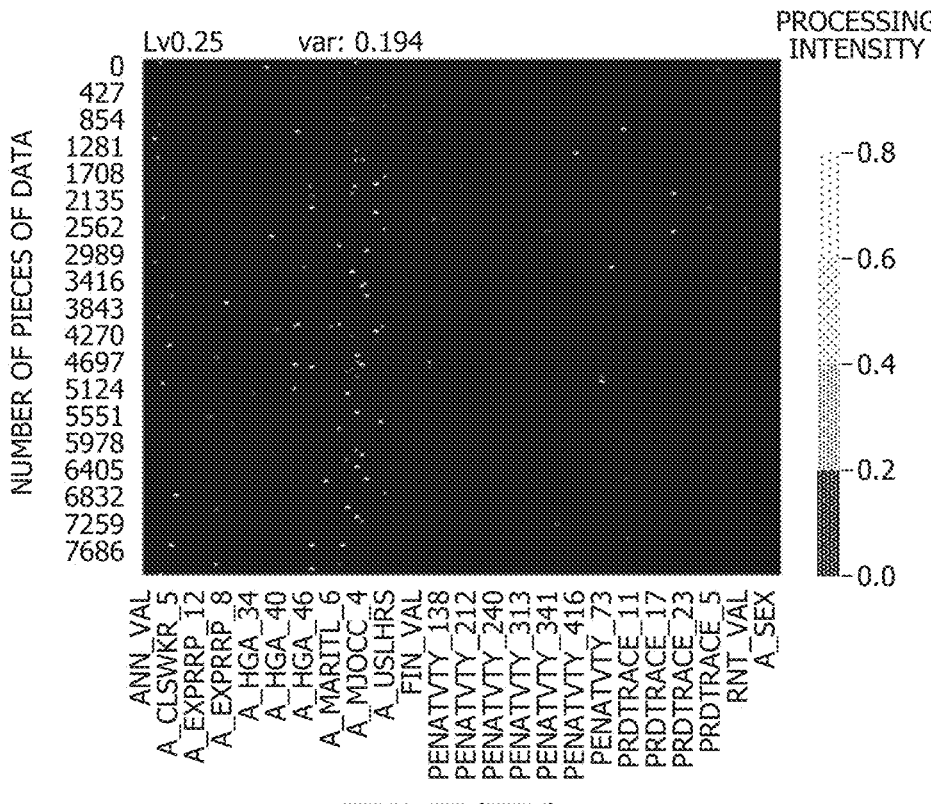
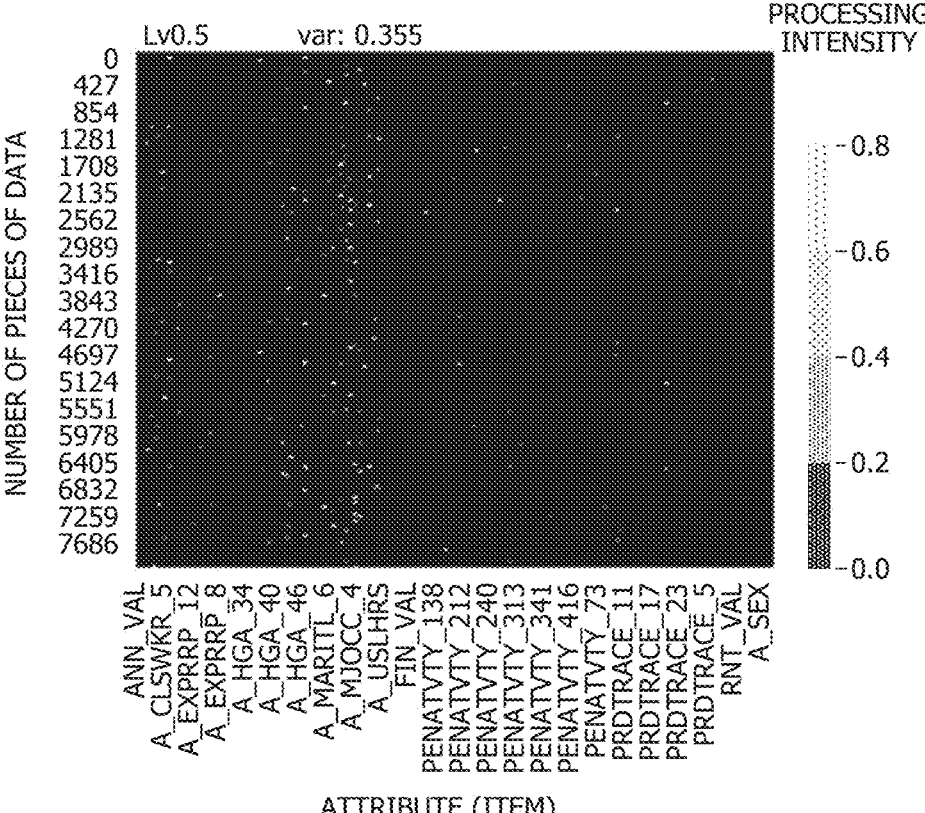

FIG. 3B
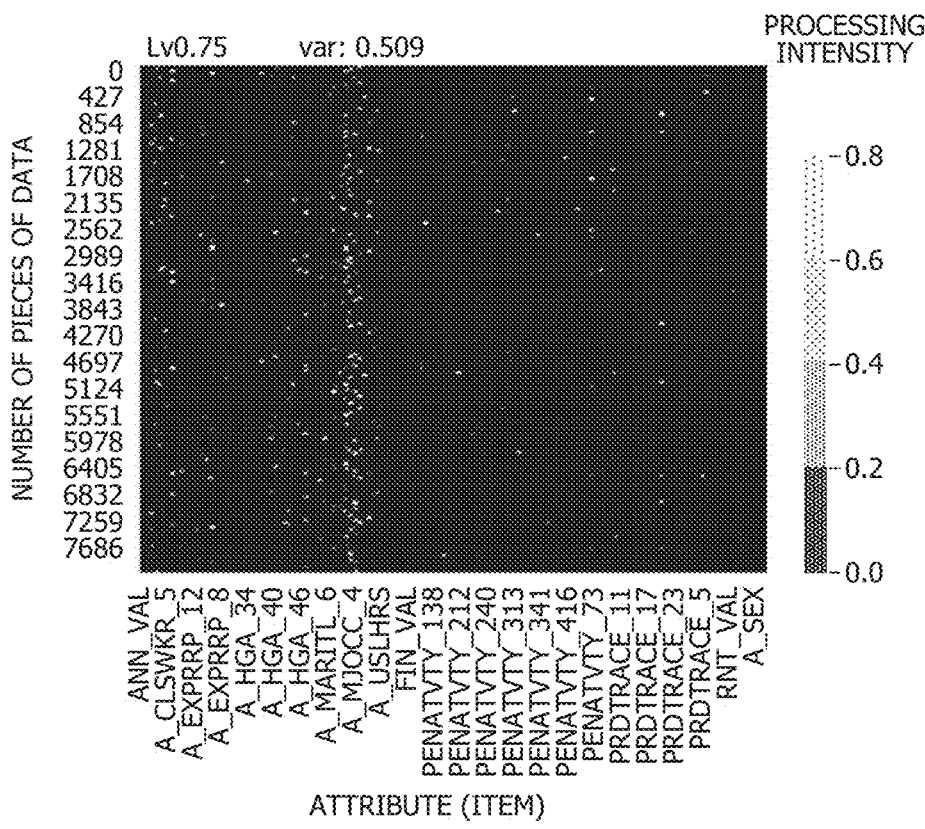
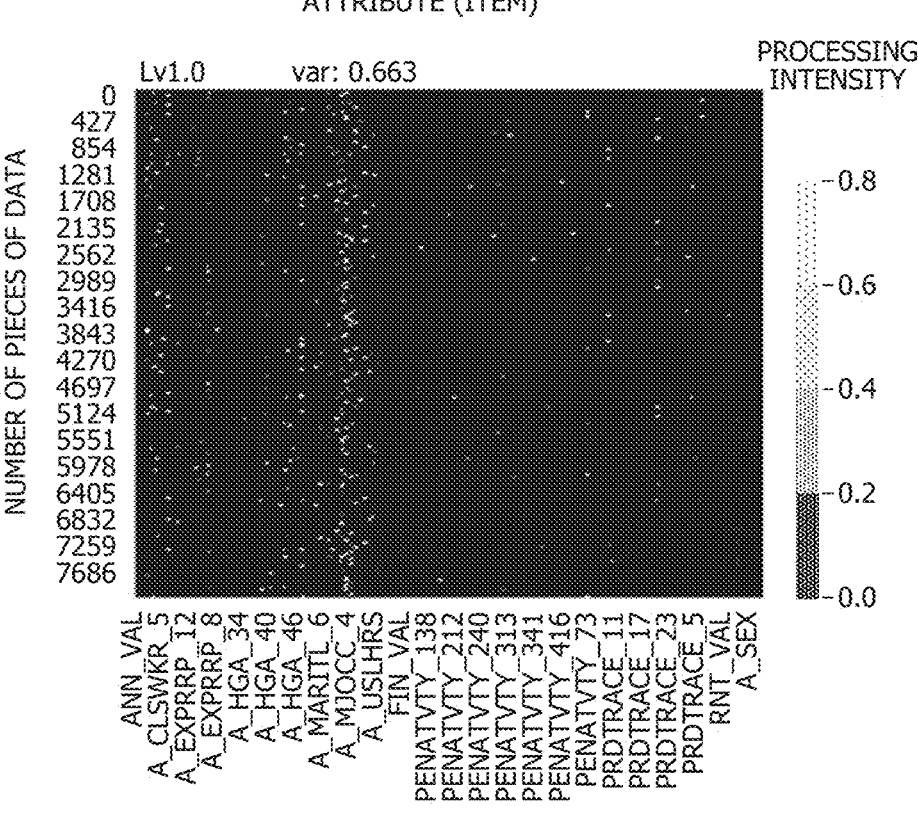

FIG. 5

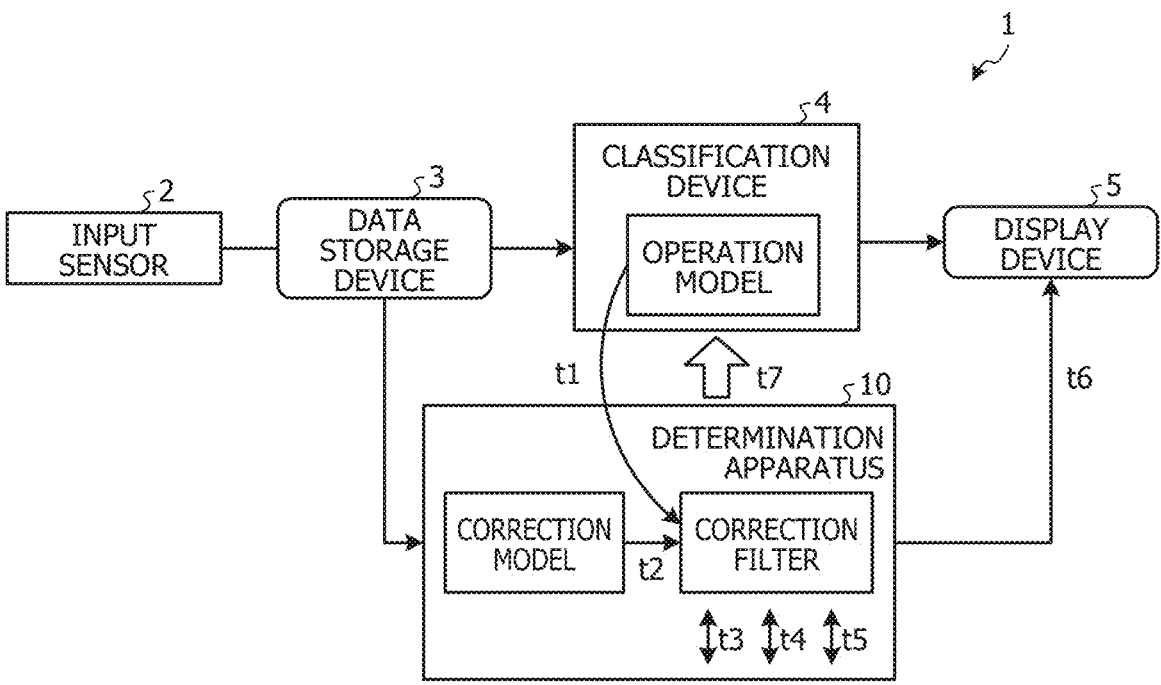

t1: COPY OPERATION MODEL TO DETERMINATION APPARATUS 10
    (FIRST TIME ONLY)
t2: EXECUTE FAIRNESS CORRECTION PROCESS ON INPUT DATA
t3: UPDATE CORRECTION MODEL BASED ON CORRECTION DATA
t4: DETERMINE ACCURACY INFLUENCE ON OPERATION MODEL BY
    USING CORRECTION MODEL
t5: DETERMINE INFLUENCE DEGREE IN A CASE WHERE CORRECTION
    MODEL IS TRAINED BY USING MODEL CONTRIBUTION DEGREE
t6: OUTPUT PREDICTION ACCURACY, FAIRNESS SCORE, AND MODEL
    INFLUENCE SCORE
t7: COPY CORRECTION MODEL TO OPERATION MODEL

FIG. 6

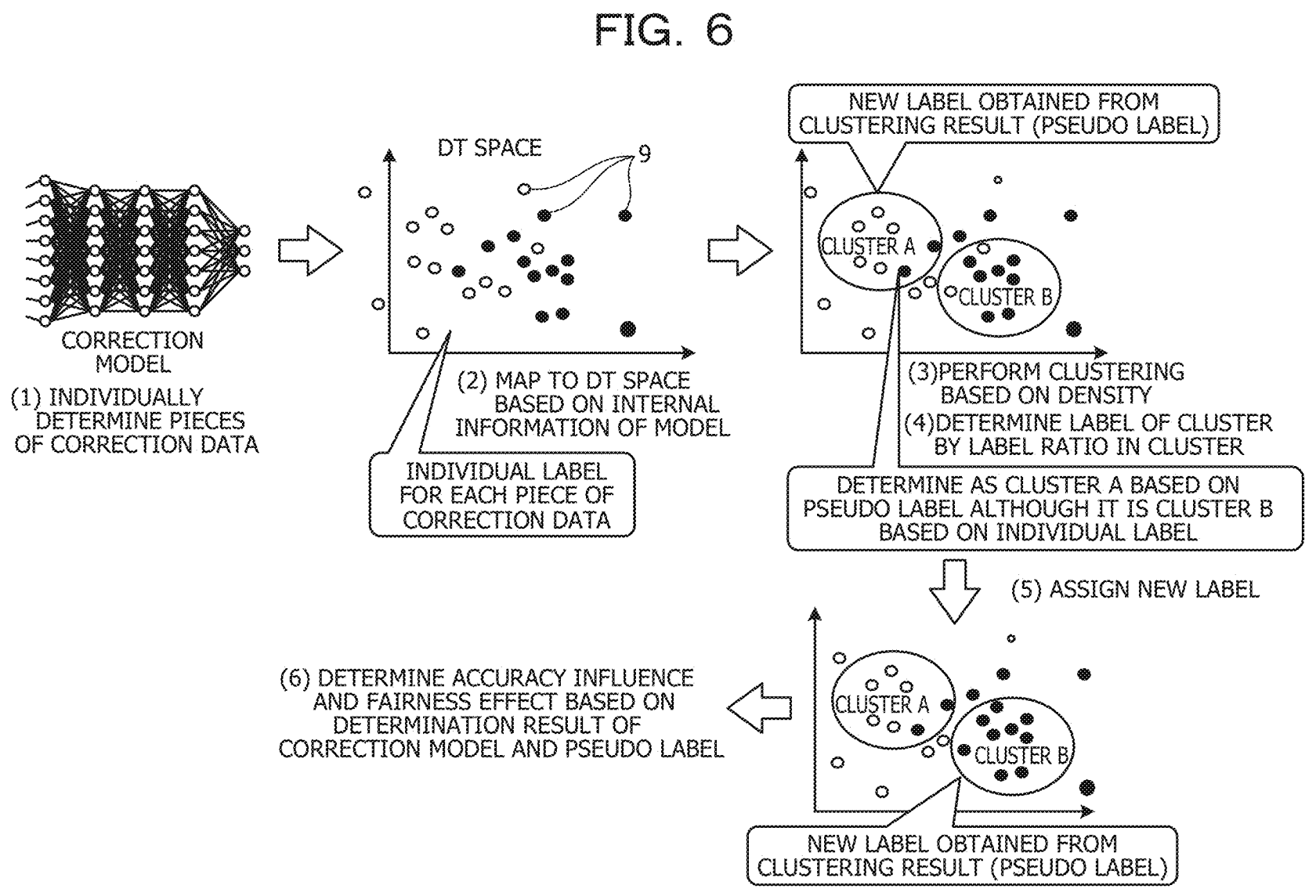

NEW LABEL OBTAINED FROM CLUSTERING RESULT (PSEUDO LABEL)

CLUSTER B

CLUSTER A (3) PERFORM CLUSTERING BASED ON DENSITY (4) DETERMINE LABEL OF CLUSTER BY LABEL RATIO IN CLUSTER

DETERMINE AS CLUSTER A BASED ON PSEUDO LABEL ALTHOUGH IT IS CLUSTER B BASED ON INDIVIDUAL LABEL (5) ASSIGN NEW LABEL

CLUSTER B

CLUSTER A

NEW LABEL OBTAINED FROM CLUSTERING RESULT (PSEUDO LABEL)

DT SPACE

9

(2) MAP TO DT SPACE BASED ON INTERNAL INFORMATION OF MODEL

INDIVIDUAL LABEL FOR EACH PIECE OF CORRECTION DATA

CORRECTION MODEL (1) INDIVIDUALLY DETERMINE PIECES OF CORRECTION DATA (6) DETERMINE ACCURACY INFLUENCE AND FAIRNESS EFFECT BASED ON DETERMINATION RESULT OF CORRECTION MODEL AND PSEUDO LABEL

START

EXECUTE FAIRNESS CORRECTION PROCESS ~S101

RETRAIN CORRECTION MODEL ~S102

DETERMINE CORRECTION DATA ~S103

CALCULATE ACCURACY OF CORRECTION MODEL ~S104

CALCULATE FAIRNESS SCORE ~S105

CALCULATE MODEL INFLUENCE SCORE
(TO FIG. 13) ~S106

SELECT CORRECTION PLAN TO BE APPLIED ~S107

UPDATE OPERATION MODEL ~S108

END

1

COMPUTER-READABLE RECORDING MEDIUM STORING DETERMINATION PROGRAM, DETERMINATION APPARATUS, AND DETERMINATION METHOD

CROSS-REFERENCE TO RELATED APPLICATION

This application is based upon and claims the benefit of priority of the prior Japanese Patent Application No. 2022-132233, filed on Aug. 23, 2022, the entire contents of which are incorporated herein by reference.

FIELD

The embodiment discussed herein is related to a determination technique.

BACKGROUND

In some cases, a machine learning model may be used for examination such as examination for loans or assist in the examination. However, as a result of training of the machine learning model with unfairly biased data, in some cases, for example, determination depending on the gender difference may be performed.

Accordingly, a fairness correction process for ensuring the fairness of determination by the machine learning model by excluding unfairly biased data is desired. In the fairness correction process, for example, training data is processed to retrain the machine learning model.

Japanese Laid-open Patent Publication No. 2021-012593, Japanese Laid-open Patent Publication No. 2021-149842, U.S. Patent Application Publication No. 2021/0304063, and U.S. Patent Application Publication No. 2020/0320429 are disclosed as related art.

SUMMARY

According to an aspect of the embodiments, a non-transitory computer-readable recording medium storing a determination program for causing a computer to execute a process, the process includes processing a first plurality of pieces of data based on a bias of the first plurality of pieces of data with reference to a first attribute, updating a first machine learning model based on a second plurality of pieces of data obtained by the processing of the first plurality of pieces of data, and generating a second machine learning model by the updating of the first machine learning model, processing a third plurality of pieces of data based on the bias of the third plurality of pieces of data with reference to the first attribute, and obtaining prediction results by inputting, to the second machine learning model, a fourth plurality of pieces of data obtained by the processing of the third plurality of pieces of data, determining respective ground truths of the fourth plurality of pieces of data by clustering respective features of the fourth plurality of pieces of data, the respective features being determined based on a parameter of the first machine learning model, determining accuracy of the second machine learning model based on the prediction results and the ground truths, identifying, based on a difference between the first plurality of pieces of data and the second plurality of pieces of data, the first attribute, out of a plurality of attributes, processed with a processing amount which is larger than or equal to a predetermined threshold, identifying, in a case where data is input and the second machine learning model performs inference, a magnitude of contribution of the first attribute to a result of the inference, and determining, based on the magnitude of the contribution, an influence degree in a case where the second machine learning model is trained by using the second plurality of pieces of data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of a fairness correction process according to an embodiment;

FIGS. 3A and 3B are diagrams illustrating examples of model influence by data processing according to the present embodiment;

FIG. 5 is a diagram illustrating a configuration example of a classification system according to the present embodiment;

FIG. 6 is a diagram illustrating an example of a method of determining accuracy according to the present embodiment;

DESCRIPTION OF EMBODIMENTS

Figure 2:
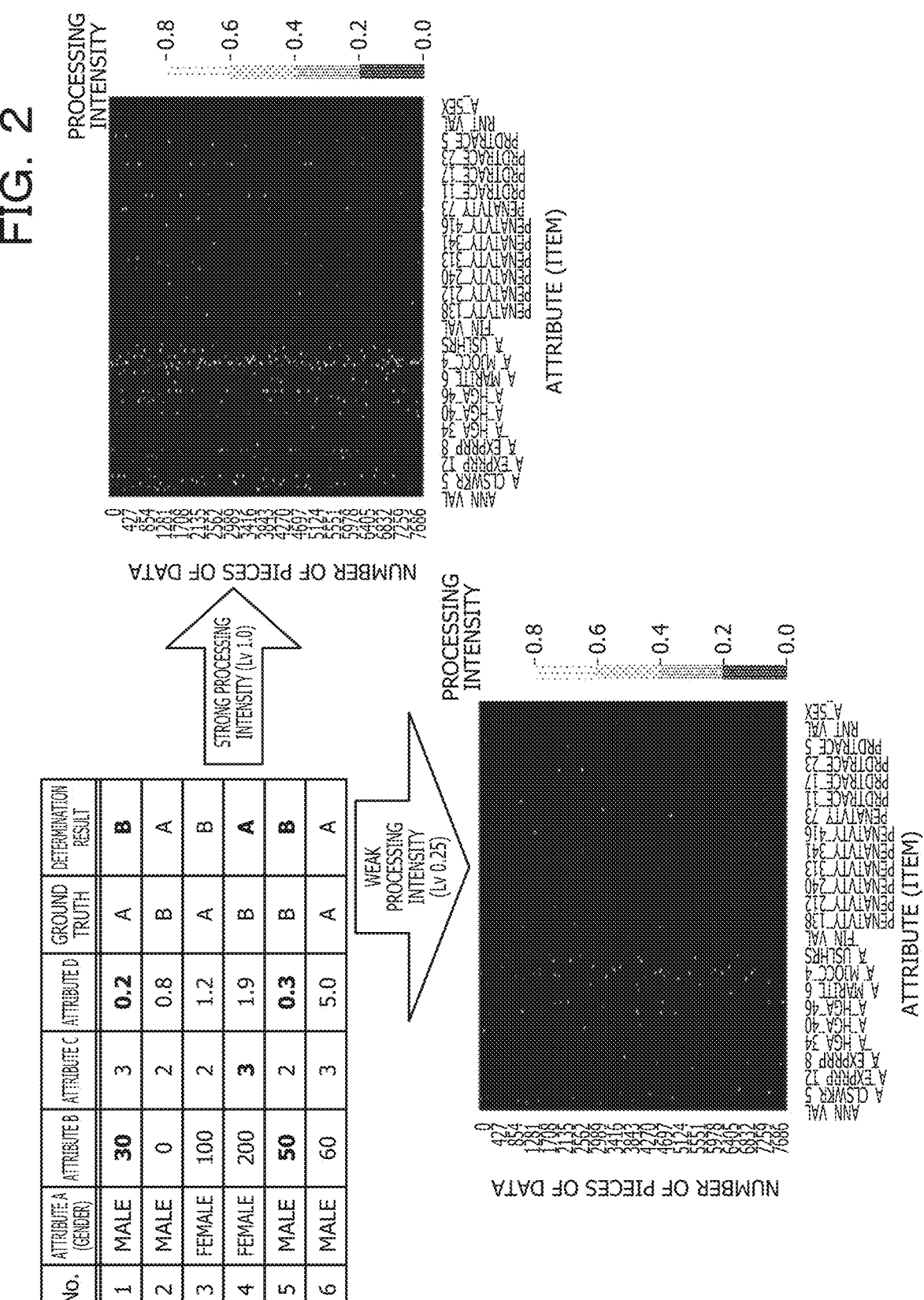
FIG. 2 is a diagram illustrating examples of data processing tendencies with the fairness correction process according to the present embodiment.

Although the fairness correction process exerts influence on the accuracy of machine learning, the fairness correction process is fundamentally changes in the training data. Thus, not only the fairness of the determination result but also the accuracy of the machine learning model is desirably maintained.

Hereinafter, an embodiment of techniques capable to indicate an accuracy influence on the machine learning model due to the fairness correction process will be described in detail with reference to the drawings. The present embodiment is not limited by the embodiment example. Portions of the embodiment example may be appropriately combined with each other as long as they do not contradict each other.

Embodiment

First, unfair determination by machine learning and a process for correcting the unfair determination are described. FIG. 1 is a diagram illustrating an example of a fairness correction process according to the present embodiment. A table on the left side of FIG. 1 illustrates examples of determination results of a machine learning model generated by machine learning with attributes A to D of input data as features and a classification result of "A" or "B" as a ground truth.

With reference to the table on the left side of FIG. 1, the determination results of a female No. 3 and a male No. 5 are different from each other although all the attributes B to D other than the gender are the same. This indicates that unfair determination depending on the gender difference is performed by the machine learning model.

Accordingly, as the fairness correction process, as illustrated in the table on the right side of FIG. 1, the attribute A indicating gender is set as a protected attribute and numerical values of the attributes B to D other than the protected attribute are changed and processed into correction data, and the machine learning model is retrained such that the determination results do not depend on the gender difference. The numerical values of the attributes B to D other than the attribute A that is the protected attribute may be converted in accordance with predetermined rules or may be randomly changed within a numerically possible range. Not all the numerical values of the attributes B to D are necessarily changed.

The effect of the fairness correction process may be determined with, for example, a DI score that is an example of a fairness score. The DI score may be calculated by using the following Expression (1).

$$Di\ score = \frac{\text{Incidence of protected attribute value}}{\text{(example: gender = female) to be}} \frac{\text{closely watched and determination result } A}{\text{Incidence of determination result } A \text{ other than}} \quad (1)$$
$$\text{protected attribute value to be closely watched}$$

With Expression (1), the effect of the fairness correction process may be determined by calculating and comparing the fairness scores of the determination results before and after the correction.

With such a fairness correction process, the machine learning model that has been trained to perform unfair determination may be corrected and the effect may be checked. However, since the input data is processed in the fairness correction process, prediction accuracy of the machine learning model may degrade. Thus, for example, in a case where the machine learning model is introduced into a system and operated, there is a problem in that application of the fairness correction process has a significant influence on the system.

FIG. 2 is a diagram illustrating examples of data processing tendencies with the fairness correction process according to the present embodiment. The examples of FIG. 2 include graphs illustrating processing tendencies of the correction data processed with two different processing intensities. Referring to the examples of FIG. 2, in the graphs indicating the processing tendencies of the correction data, the horizontal axis represents the attributes of pieces of data, the vertical axis represents the number of pieces of data on an attribute-by-attribute basis, and the processing intensity is indicated by colors in the graphs. The processing intensity may be calculated from the amount of difference between the input data and correction data for the input data. Referring to the graphs, it may be seen that there is a bias in the attributes selected as targets of the processing by the fairness correction process, for example, the processing ranges, and the amount of change in the data increases as the processing intensity increases.

Meanwhile, in a long-term operation of a system using the machine learning model, periodic retraining is desired to maintain the accuracy of the machine learning model. Thus, it is desired that the influence of the training data exerted on the accuracy of the existing machine learning model be small. The influence exerted on the accuracy of the machine learning model may be simply represented as influence exerted on the machine learning model, influence on the machine learning model, or the like in some cases. When the processing tendency illustrated in FIG. 2 and the like are considered, training data exerting a small amount of influence on the machine learning model is, for example, training data with a small change before and after execution of the fairness correction process. For example, it may be thought that the influence exerted on the machine learning model is small when the processing range of the correction data is wide and the processing intensity is weak. As an index of a model influence degree, the variance value of the correction data for the processing range is expressed. Correction data having a smaller variance value and a weaker processing intensity has a smaller influence on the machine learning model.

FIGS. 3A and 3B are diagrams illustrating examples of model influence due to data processing according to the present embodiment. The examples of FIGS. 3A and 3B include graphs illustrating processing tendencies of the correction data processed with four different processing intensities. The variance value for the processing range of the correction data is indicated by var. As is the case with the processing intensity, var may be calculated from the difference amount between the input data and its correction data, and, as illustrated in FIGS. 3A and 3B, var increases as the processing intensity increases. Thus, it may be thought that, when var is small, the influence on the machine learning model is small.

However, referring to FIGS. 3A and 3B, for example, it may be understood that an attribute "A_MJOCC_4" is processed most and there is a bias in the attributes that are processed. Thus, whether an attribute that is processed is an attribute which draws attention of the machine learning model is also important in considering the influence on the machine learning model. For example, in a case where the attribute that is processed is not an attribute that draws attention, it may be thought that, even when the processing intensity is high, the influence on the machine learning model is actually small. Whether an attribute draws the attention of the machine learning model may be determined by the degree of attention with respect to the machine learning model, for example, a model contribution degree calculated by an existing technique. Thus, according to the present embodiment, influence on the machine learning model is determined in consideration of, in addition to var, the model contribution degree of the attribute that is processed.

[Functional Configuration of Determination Apparatus 10]

Figure 4:
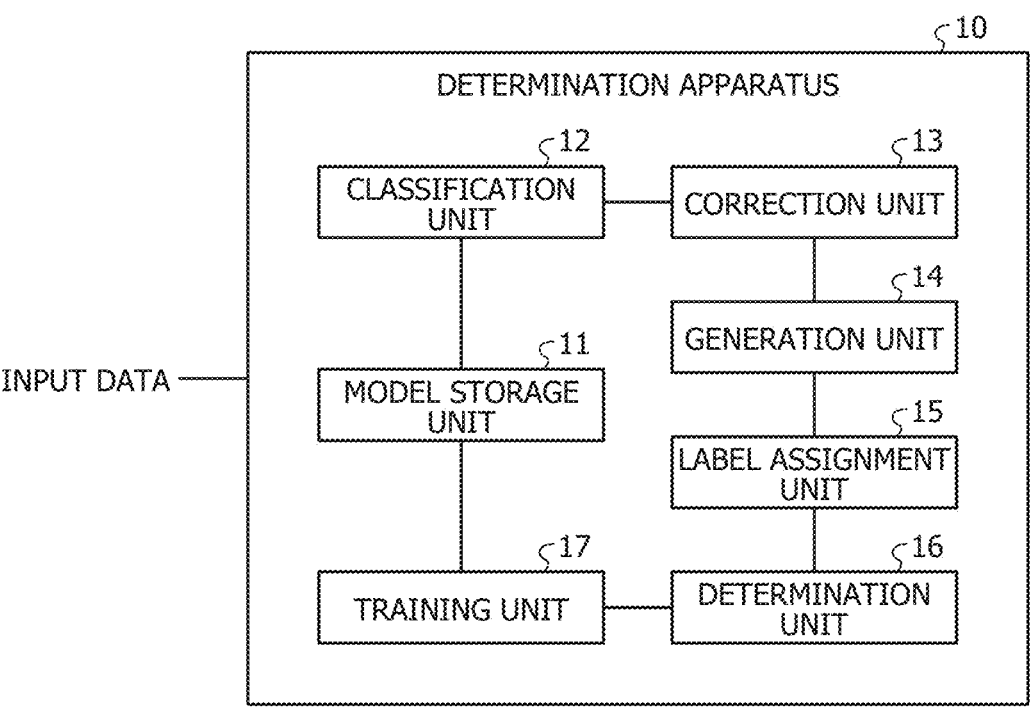
FIG. 4 is a diagram illustrating a configuration example of a determination apparatus according to the present embodiment.

Next, a functional configuration of a determination apparatus 10 that is an operating subject according to the present embodiment is described. FIG. 4 is a diagram illustrating a configuration example of the determination apparatus 10 according to the present embodiment. The determination apparatus 10 indicates accuracy influence on the machine learning model due to the fairness correction process.

For indicating the accuracy influence on the machine learning model, the determination apparatus 10 compares a ground truth obtained by clustering of features based on parameters of the machine learning model with a prediction result of the correction model generated by retraining the machine learning model with correction data. The determination apparatus 10 identifies the model contribution degree of the attribute processed with a large processing amount identified from the difference between the input data and the correction data and determines, based on the model contribution degree, the influence degree in a case where the machine learning model is trained. The determination apparatus 10 includes a model storage unit 11, a classification unit 12, a correction unit 13, a generation unit 14, a label assignment unit 15, a determination unit 16, and a training unit 17.

The model storage unit 11 stores, for example, the machine learning model. For example, the model storage unit 11 stores parameters of a neural network of the machine learning model. The parameters include weights between neurons. The weights between neurons are updated by the machine learning.

For example, the classification unit 12 uses the machine learning model stored in the model storage unit 11 to classify the correction data generated by converting, with the correction unit 13, the input data and outputs as an inference result of the machine learning model.

For example, as illustrated in the table on the right side of FIG. 1, the correction unit 13 generates the correction data by converting the input data for the machine learning model by using correction filters created according to predetermined rules. To correct a machine learning model that has been trained to make an unfair determination, the correction data is input to the machine learning model as the input data or used as the training data for retraining the machine learning model.

For example, based on output values of neurons in an output layer of the machine learning model and the determination results, the generation unit 14 plots points corresponding to pieces of the correction data in a durable topology (DT) space, which is a feature space of the correction data. The DT space is the feature space of the correction data having the axes corresponding to the output values of the neurons in the output layer. The generation unit 14 performs clustering on the points plotted in the DT space based on classification-by-classification densities. The details of such processing for the DT space will be described later.

For example, the label assignment unit 15 determines a label of each cluster from the clustering result by the generation unit 14 and assigns the determined label to pieces of the correction data corresponding to the points belonging to the cluster.

For example, the determination unit 16 determines the prediction accuracy of the machine learning model based on the classification result obtained by the classification unit 12, for example, the prediction result of the machine learning model for the correction data, and the label assigned by the label assignment unit 15. When the label assigned by the label assignment unit 15 is set as the ground truth, the determination unit 16 may determine the influence of the fairness correction process on the prediction accuracy of the machine learning model.

The determination unit 16 identifies a first attribute processed with a processing amount larger than or equal to a predetermined threshold out of a plurality of the attributes based on, for example, the difference between the input data and the correction data obtained by processing the input data based on the bias of the input data with reference to the first attribute. The first attribute may be the protected attribute, and the input data corresponds to a first plurality of pieces of data, and the correction data corresponds to a second plurality of pieces of data obtained by processing the first plurality of pieces of data, for example, performing the correction process on the first plurality of pieces of data. The first attribute processed with a processing amount larger than or equal to the predetermined threshold out of the plurality of attributes may be, for example, a predetermined number of first attributes extracted in descending order with a processing amount larger than or equal to the predetermined threshold out of the plurality of attributes.

The determination unit 16 identifies, for example, the magnitude of contribution of the first attribute to the inference result in a case where the classification unit 12 inputs the correction data and the machine learning model performs inference. The determination unit 16 determines, for example, the influence degree based on the magnitude of the identified contribution in a case where the machine learning model is trained with the correction data.

For example, the training unit 17 retrains and updates the machine learning model stored in the model storage unit 11 by using the correction data as the feature and the label assigned by the label assignment unit 15 as the ground truth.

Next, with reference to FIG. 5, a functional configuration of a classification system 1 according to the present embodiment is described. FIG. 5 is a diagram illustrating a configuration example of the classification system 1 according to the present embodiment. As illustrated in FIG. 5, the classification system 1 includes an input sensor 2, a data storage device 3, a classification device 4, a display device 5, and the determination apparatus 10.

The input sensor 2 is a sensor that obtains data to be classified. For example, in the case of classification of images, the input sensor 2 is a camera.

The data storage device 3 stores the input data obtained by an input sensor 2. For example, the data storage device 3 stores image data.

The classification device 4 is a device that classifies the input data stored in the data storage device 3 by using an operation model for each piece of the input data. Here, the operation model refers to a machine learning model operated in the classification system 1. For example, the classification device 4 inputs, to the operation model, an image of a person captured by a camera device, determines whether the person wears a uniform, and outputs whether the person wears the uniform as the classification result. The classification device 4 may transmit the classification result to the display device 5.

To indicate the accuracy influence on the operation model due to the fairness correction process, the determination apparatus 10 copies the operation model in advance and stores it as a correction model (t1). Although the correction model is a copy of the operation model only for the first time, the retraining is performed based on the correction data after that, and the parameters of the correction model are updated. An example of the operation model corresponds to a first machine learning model, and an example of the correction model corresponds to a second machine learning model.

For example, the determination apparatus 10 causes the input data to pass through a correction filter created in accordance with a predetermined rule, thereby executing the fairness correction process on the input data and generating correction data (t2). The correction data is generated for each piece of input data. In a case where there are a plurality of predetermined rules as a plurality of correction plans, the correction filters are created according to the respective rules, and a plurality of pieces of correction data corresponding to the respective correction plans are generated by causing the pieces of input data through the respective correction filters. An example of the predetermined rule corresponds to a first rule.

The determination apparatus 10 retrains and updates the correction model based on the correction data (t3). In a case where there are the plurality of correction plans, the correction models corresponding to the respective correction plans are updated based on the pieces of correction data corresponding to the respective correction plans. An example of the retrained and updated correction model corresponds to a second machine learning model obtained by updating a first machine learning model based on a second plurality of pieces of data obtained by processing a first plurality of pieces of data based on a bias of the first plurality of pieces of data with reference to a first attribute.

Next, the determination apparatus 10 inputs the correction data to the correction model and determines the accuracy influence on the operation model due to the fairness correction process (t4). In a case where there are the plurality of correction plans, the correction data is input to the corresponding correction models, and the accuracy influence is determined for each correction plan. Regarding the determination of the accuracy influence on the operation model, manual observation may be performed by labeling the input data at certain time intervals using the data with a correct answer. In this case, however, the cost is incurred to, for example, create the data with a correct answer. Thus, according to the present embodiment, the determination apparatus 10 performs density-based clustering based on the output result of the correction model for the input data and automatically labels the input data based on the clustering result.

FIG. 6 is a diagram illustrating an example of a method of determining the accuracy according to the present embodiment. First, the determination apparatus 10 inputs a plurality of pieces of correction data to the correction model, individually performs the determination, and assigns the label to each piece of the correction data based on the determination result. The label assigned here is referred to as an "individual label". Examples of the individual label correspond to prediction results obtained by inputting, to the second machine learning model, a fourth plurality of pieces of data, for example, the correction data, obtained by processing a third plurality of pieces of data based on a bias of the third plurality of pieces of data with reference to the first attribute.

Classification by using the correction model is performed based the output values of the neurons in the output layer of the correction model. For example, as illustrated in FIG. 6, the determination apparatus 10 plots points 9 in the DT space based on the output values of the neurons in the output layer and classification results. The DT space is the feature space of the input data having the axes corresponding to the output values of the respective neurons in the output layer. The axes in the DT space corresponds to output values of the respective neurons in the output layer. Although the DT space is a three-dimensional space because there are three neurons in the output layer in the example illustrated in FIG. 6, the DT space is expressed two-dimensionally for convenience of description. In the example illustrated in FIG. 6, the classification results by using the correction model, for example, the individual labels are represented by the types of the points 9, for example, a blank circle and a solid circle.

Next, the determination apparatus 10 performs clustering on the points 9 based on classification-by-classification density of each point 9 in the DT space to create the clusters. The density of the points 9 is, for example, the number of points 9 per unit section of the feature. In the example illustrated in FIG. 6, a cluster A including blank circles and a cluster B including solid circles are created.

Next, the determination apparatus 10 determines a new label of each cluster based on the ratio of the individual labels in the cluster and assigns the new label to corresponding pieces of the input data for the points 9 belonging to the cluster. When the new label assigned here is set as a "pseudo label" and the pseudo label is set as a ground truth, the determination apparatus 10 may determine the accuracy influence on the operation model due to the fairness correction process. Examples of the pseudo label correspond to ground truths determined by clustering respective features of the fourth plurality of pieces of data determined based on a parameter of the first machine learning model, for example, the operation model.

The prediction accuracy of the machine learning model is determined by an evaluation index of an existing technique, for example, an accuracy (correct answer rate). The accuracy may be calculated by using the following Expression (2).

$$\text{Accuracy} = \frac{\text{Number of correct answers}}{\text{Total number of pieces of input data}} \qquad (2)$$

In Expression (2), when the pseudo labels are set as ground truths, the number of correct answers is, for example, a number obtained by subtracting the number of pseudo labels different from the classification results with the correction model, for example, the number of incorrect answers, from the number of all the pieces of input data.

As described above the determination apparatus 10 may determine the accuracy influence on the operation model due to the fairness correction process by using, for example, Expression (2). For example, the determination apparatus 10 may use Expression (1) to calculate the fairness scores separately for the classification results with the correction model and the pseudo labels and compare the calculated fairness scores to determine the effect of the fairness correction process.

Figure 7:
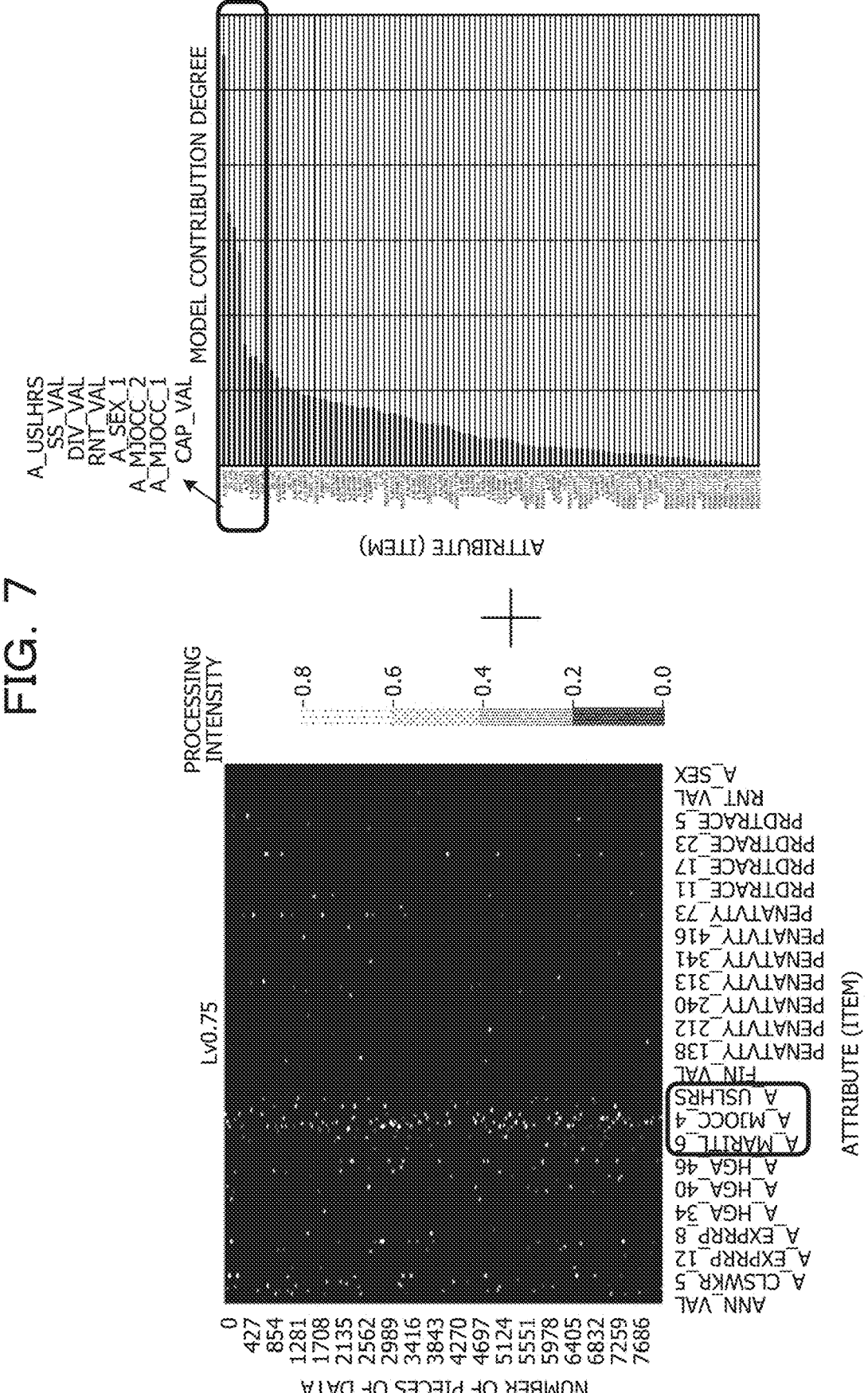
FIG. 7 is a diagram illustrating examples of a processing tendency and a model contribution degree due to the data processing according to the present embodiment.

Returning to the description of FIG. 5, the determination apparatus 10 determines the influence degree in a case where the correction model is trained by using the model contribution degree (t5). FIG. 7 is a diagram illustrating examples of the processing tendency and the model contribution degree due to the data processing according to the present embodiment. As illustrated on the left side of FIG. 7, by using the processing intensity of the entire correction data, for example, the variance, the determination apparatus 10 may determine the processing tendency by the data processing such as whether the attributes are processed uniformly or biased. However, only with the variance, it is difficult for the determination apparatus 10 to determine whether the attributes on which the processing is performed, for example, the attributes surrounded in a box on the left side of FIG. 7 are attributes having a high model influence. Accordingly, as illustrated on the right side of FIG. 7, for the determination on the model influence, the determination apparatus 10 also uses whether the model contribution degree of the processed attributes, for example, the attributes in the box is high. For example, the determination apparatus 10 calculates the influence degree on the machine learning model by using the variance of the correction data and also using the degree of matching between the processed attributes and the number of processes thereof and the model contribution degree (hereafter, referred to as a "contribution degree rank").

Figure 8:
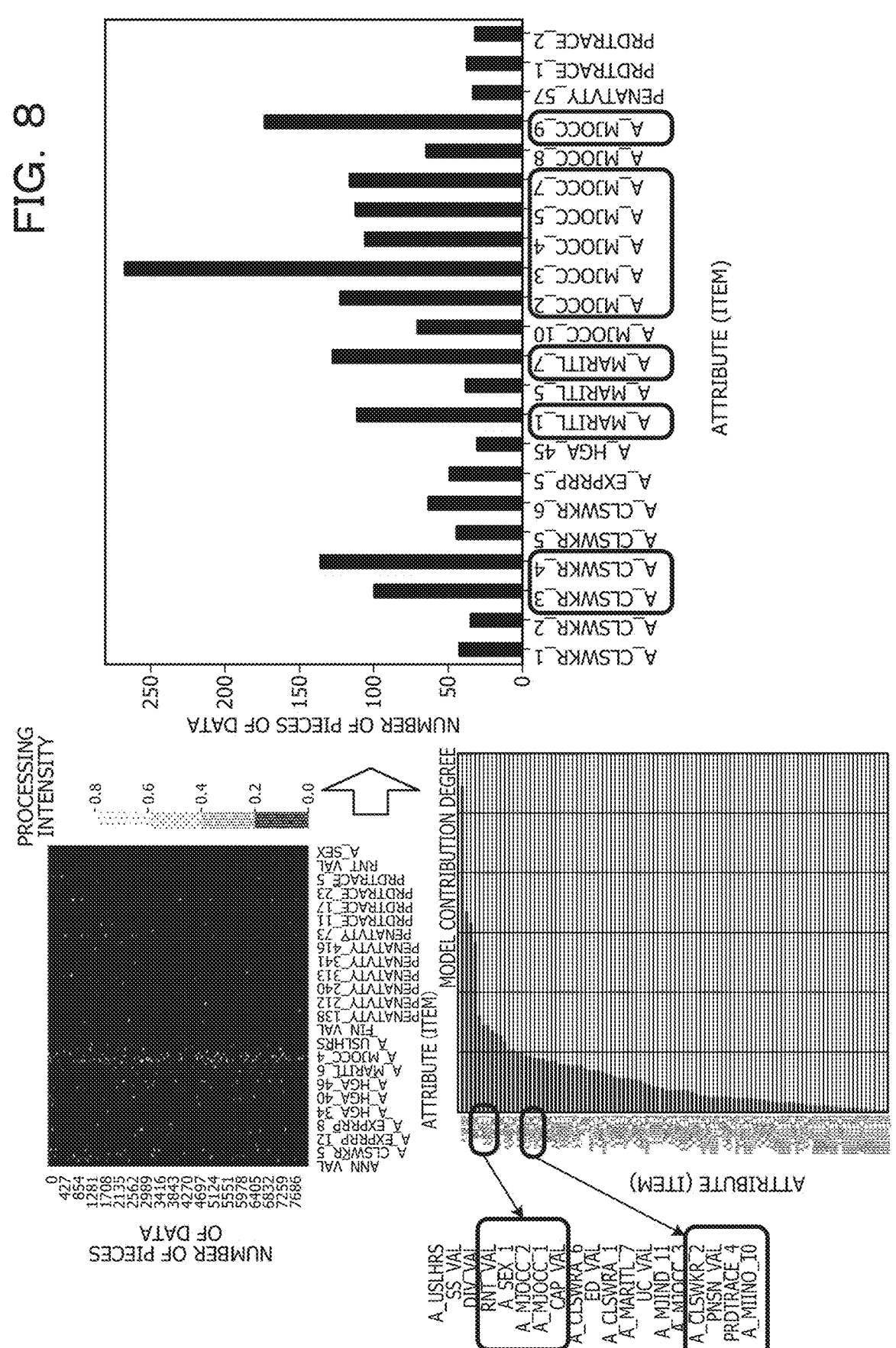
FIG. 8 is a diagram illustrating an example of a determination on an influence degree by using the processing tendency and the model contribution degree according to the present embodiment.

FIG. 8 is a diagram illustrating an example of a determination on the influence degree by using the processing tendency and the model contribution degree according to the present embodiment. First, the determination apparatus 10 extracts, for example, strongly processed attributes from the difference between the input data and the correction data as the processing tendency of the correction data. For example, as illustrated in the upper left part of FIG. 8, the determination apparatus 10 calculates the absolute values of the difference between the input data and the correction data by creating a heat map and extracts the attributes strongly processed with a processing intensity larger than or equal to a certain value.

As illustrated in the lower left part of FIG. 8, for example, the determination apparatus 10 calculates the model contribution degree of each attribute. The model contribution degree, which varies depending on, for example, the target machine learning model, is calculated by using an existing technique such as a filter method, a gain method, or the like.

As illustrated on the right side of FIG. 8, for example, the determination apparatus 10 counts the number of pieces of data of the extracted attributes strongly processed with a processing intensity larger than or equal to a certain value, extracts a predetermined number of the attributes in descending order, and calculates a contribution degree rank from the model contribution degrees of the extracted attributes. The contribution degree rank is calculated by using, for example, Expression (3) below.

$$\text{Contribution degree rank} = \sum_{n=1}^{num} \left( \text{Rank}^{-1} * \text{Count} \right) \qquad (3)$$

In Expression (3), num is, for example, a number indicating each of the predetermined number of the attributes extracted in descending order, Rank indicates, for example, the rank of the model contribution degree of each of the predetermined number of the attributes extracted in descending order, and Count indicates, for example, the counted number of pieces of data of each of the predetermined number of the attributes extracted in descending order.

Based on the variance value of the correction data and the contribution degree rank, the determination apparatus 10 determines the model influence degree. The model influence degree is determined by, for example, mapping the model influence degree from the variance value of the correction data and the contribution degree rank.

Figure 9:
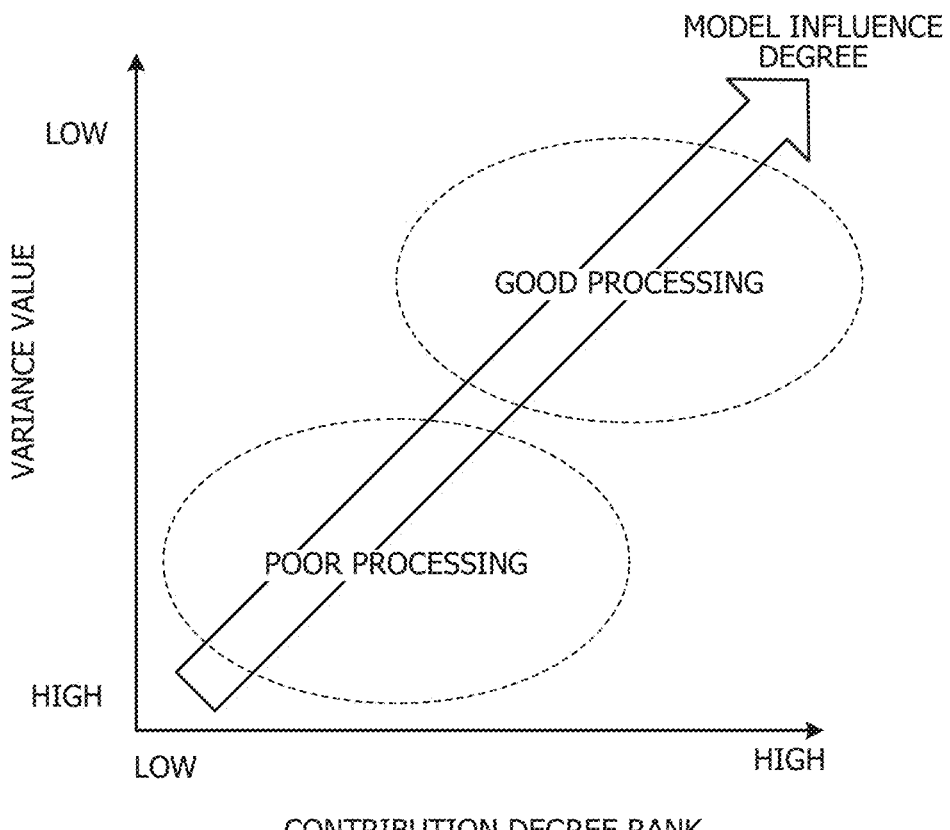
FIG. 9 is a diagram illustrating an example of output of a model influence degree according to the present embodiment.

FIG. 9 is a diagram illustrating an example of output of the model influence degree according to the present embodiment. As illustrated in FIG. 9, the determination apparatus 10 maps the model influence degree based on the variance value of the correction data and the contribution degree rank. For example, the processing of the training data is good for the machine learning model when the data is entirely processed, for example, the variance value is small, and the mainly processed attributes have a high contribution degree to the machine learning model. Accordingly, the determination apparatus 10 may determine that the correction data with a low variance value and a high contribution degree rank, in the case of FIG. 9, the correction data mapped at the upper right of the graph has a higher model influence degree and exerts a smaller influence on the accuracy of the machine learning model.

Returning to the description of FIG. 5, the determination apparatus 10 outputs the fairness score due to the fairness correction process and the prediction accuracy of the machine learning model respectively calculated by using Expressions (1) and (2), and the model influence score for each piece of the correction data (t6). The model influence score may be calculated, for example, by the following expression: "model influence score=(α×1/variance value+β×contribution degree rank)" with the contribution degree rank calculated by using Expression (3). In the above-described expression, α and β are weight parameters for the variance value and the contribution degree rank, respectively. As described above, by outputting the influence of the fairness correction process on the operation model, for example, the fairness score, the prediction accuracy, and the model influence score together, the determination apparatus 10 or the user may grasp the influence and effect of the fairness correction process in more detail. Based on the prediction accuracy of the machine learning model, the model influence score, and the fairness score due to the fairness correction process, the determination apparatus 10 or the user may select a correction model to be applied to the operation model among various correction model candidates.

Figure 10:
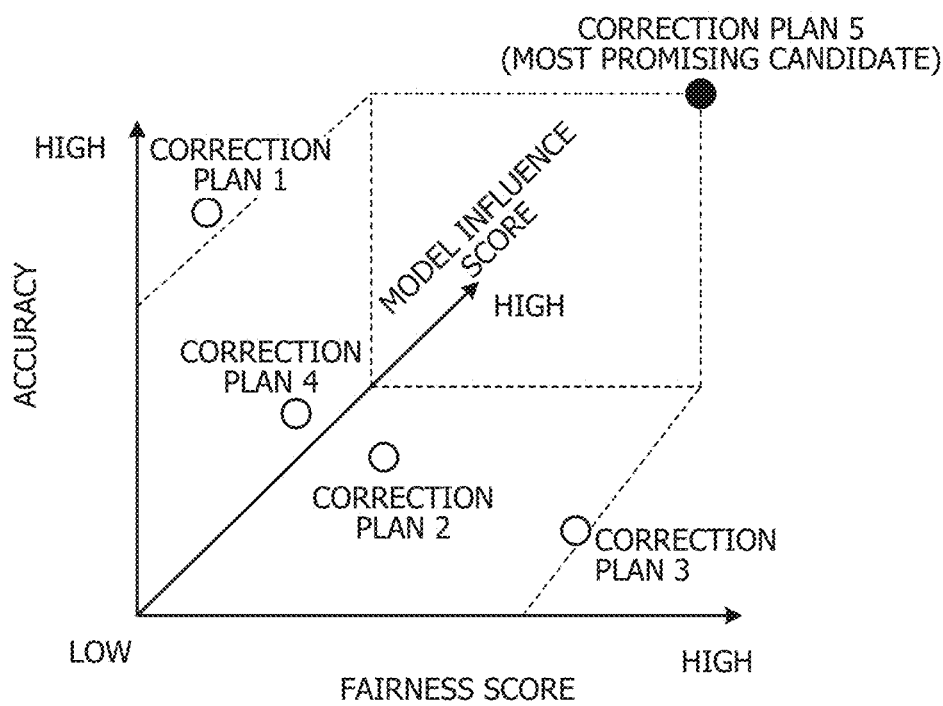
FIG. 10 is a diagram illustrating an example of candidate determination by using a model influence score according to the present embodiment.

FIG. 10 is a diagram illustrating an example of candidate determination by using the model influence score according to the present embodiment. A graph in FIG. 10 is a graph of three-dimensional representation obtained by mapping correction model plans 1 to 5. In this graph, the x-axis represents the fairness score due to the fairness correction process, the y-axis represents the prediction accuracy of the machine learning model, and the z-axis represents the model influence score.

As illustrated in FIG. 10, the determination apparatus 10 may select, as the most promising candidate used for training of the machine learning model, the correction data with which all of the fairness score, the prediction accuracy of the machine learning model, and the model influence score are high (correction plan 5 in the example illustrated in FIG. 8). Selection of such a correction plan may be executed by the determination apparatus 10 by, for example, setting predetermined thresholds respectively for the fairness score, the prediction accuracy, and the model influence score and using the thresholds.

Figure 11:
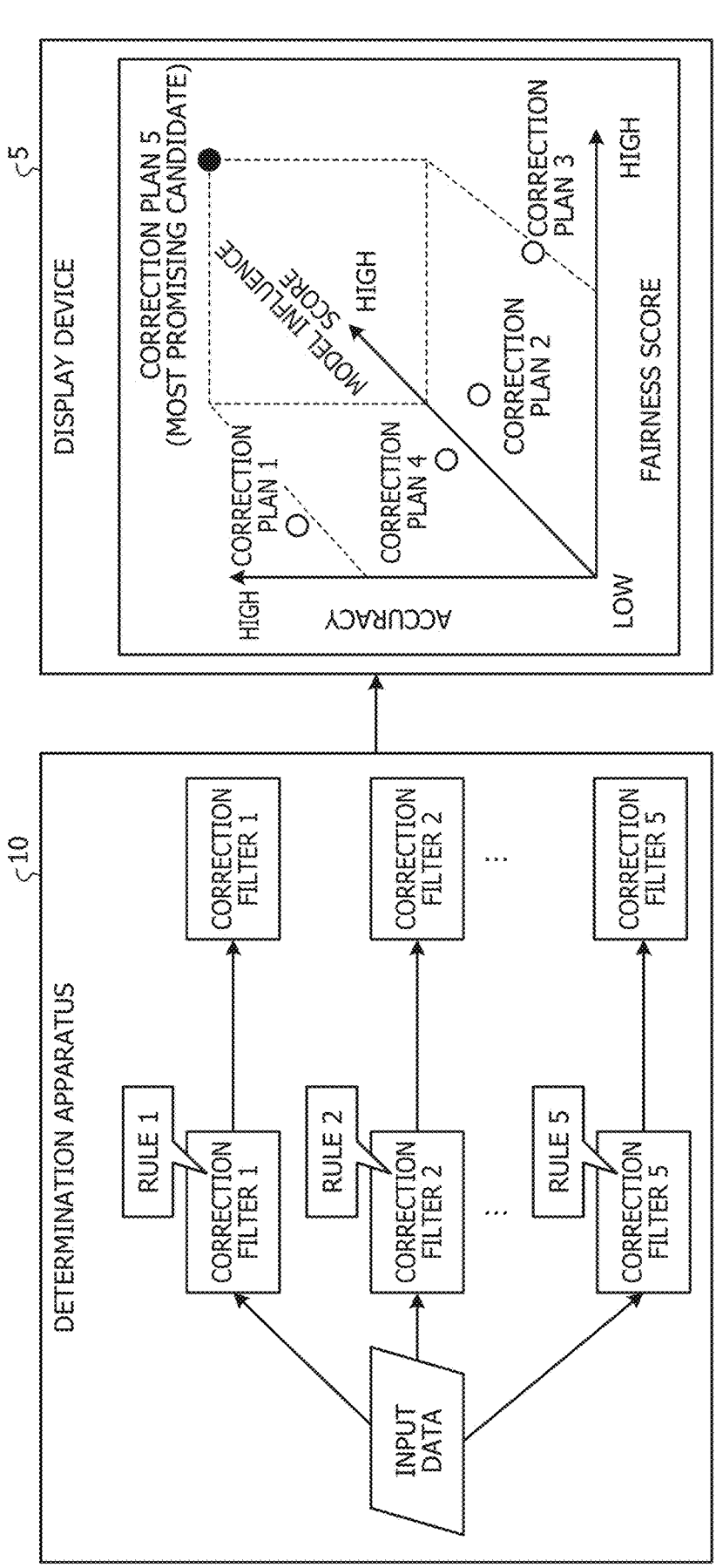
FIG. 11 is a diagram illustrating an example of a method of outputting prediction accuracy, a fairness score, and the model influence score according to the present embodiment.

A method of outputting the plurality of correction plans is described in more detail. FIG. 11 is a diagram illustrating an example of a method of outputting the prediction accuracy, the fairness score, and the model influence score according to the present embodiment. As illustrated on the left side of FIG. 11, the determination apparatus 10 causes the input data to pass through correction filters 1 to 5 respectively created in accordance with a plurality of different rules 1 to 5, generates the respective pieces of correction data, and inputs the pieces of correction data to the corresponding correction models. As illustrated in FIG. 6, the determination apparatus 10 assigns the pseudo label to each piece of correction data and calculates the prediction accuracy and the fairness score for each correction plan based on the pseudo label. Also, the determination apparatus 10 calculates the model influence score for each piece of correction data. As illustrated on the right side of FIG. 11, the determination apparatus 10 outputs, to the display device 5, a graph of three axes representation in which the prediction accuracy, the fairness score, and the model influence score are set as respective axes and causes the display device 5 to display the graph.

Returning to the description of FIG. 5, the determination apparatus 10 replaces the operation model with the copy of the correction model updated by the retraining (t7). In the case where there are the plurality of correction plans, the operation model is replaced with a copy of the correction model corresponding to the selected single correction plan. When the operation model is replaced, the determination apparatus 10 may also apply the correction filter to the classification device 4 to convert the input data to the operation model into the correction data by using the correction filter. When there are the plurality of correction plans, the correction filter applied to the classification device 4 is also the correction filter corresponding to the selected single correction plan. In this way, the determination apparatus 10 may apply the appropriate fairness correction process to the machine learning model while indicating the accuracy influence on the machine learning model due to the fairness correction process.

[Flow of Process]

Figure 12:
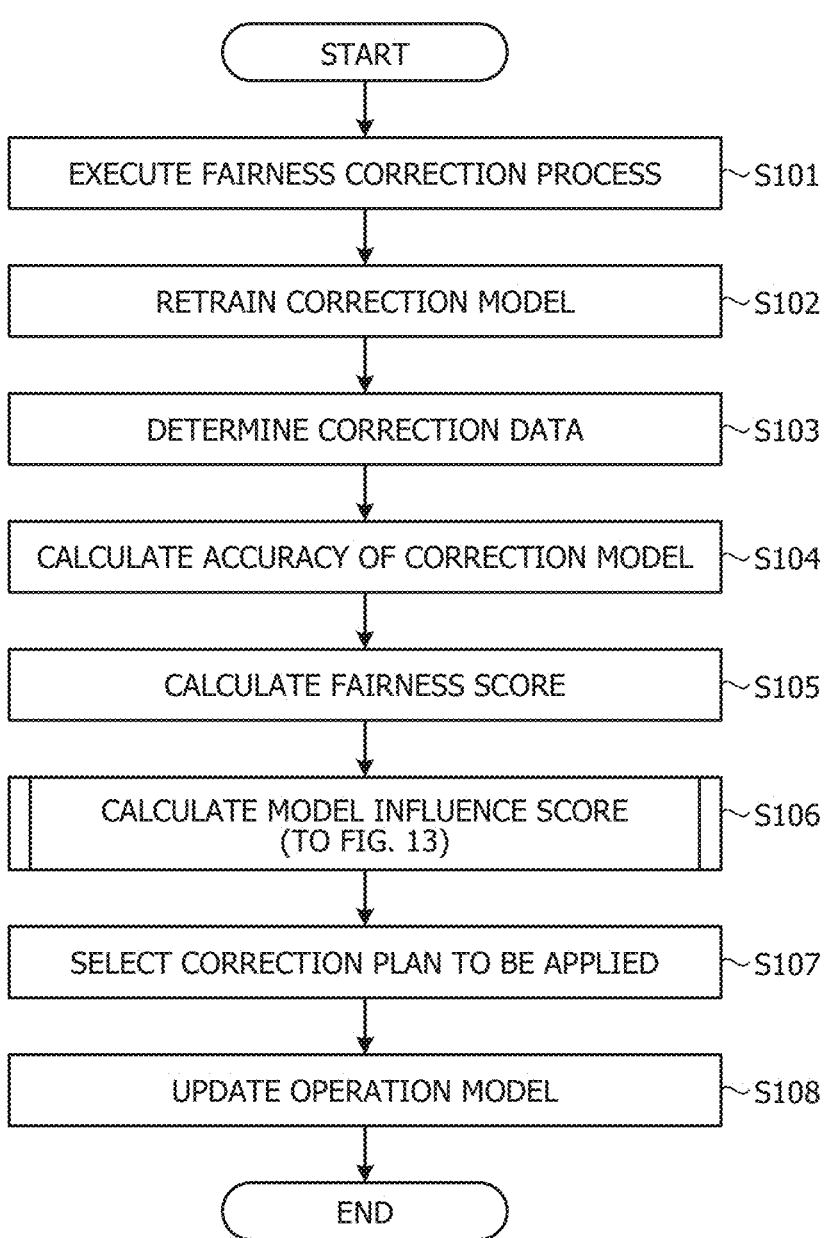
FIG. 12 is a flowchart illustrating an example of a flow of a determination process according to the present embodiment.
Figure 13:
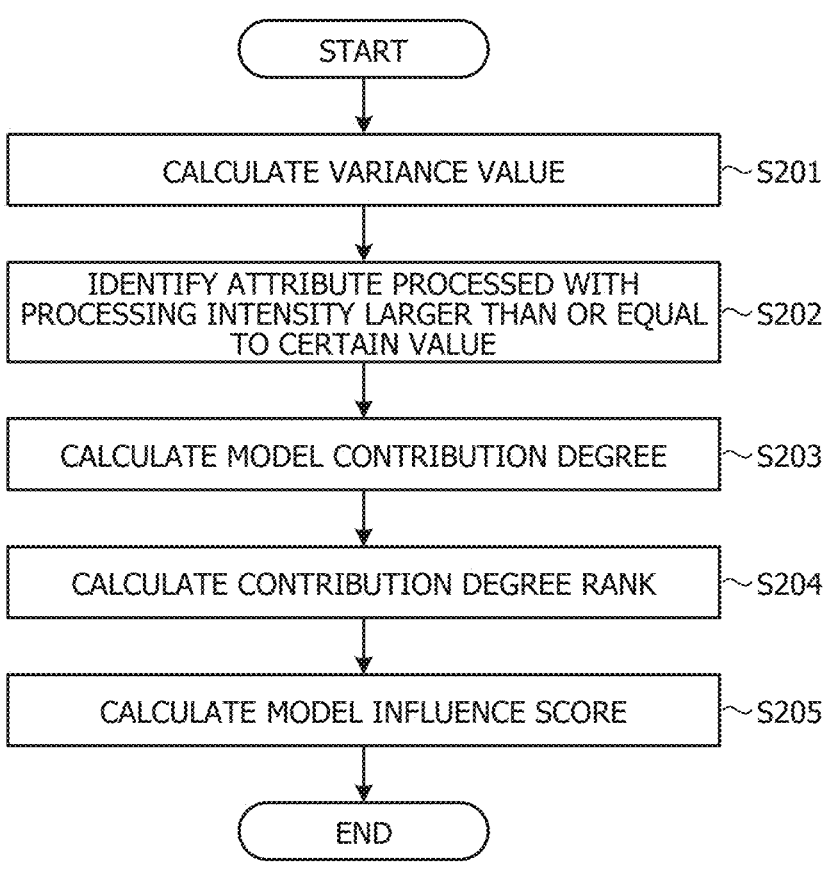
FIG. 13 is a flowchart illustrating an example of a flow of a model influence score calculation process according to the present embodiment.

Next, with reference to FIGS. 12 and 13, a flow of a determination process performed by the determination apparatus 10 is described. FIG. 12 is a flowchart illustrating an example of the flow of the determination process according to the present embodiment. For example, when the input data is input to the operation model, the determination process is executed by using the input data. As the correction model used in the determination process, the operation model is copied only at the first time.

First, as illustrated in FIG. 12, the determination apparatus 10 executes the fairness correction process on the input data (operation S101). For example, the determination apparatus 10 causes the input data to pass through the correction filters respectively created in accordance with a plurality of different rules and generates respective pieces of the correction data for the correction plans.

Next, the determination apparatus 10 retrains and updates the correction model based on the corresponding piece of correction data for each correction plan (operation S102). Thus, the correction model for each correction plan is generated.

Next, for each correction plan, the determination apparatus 10 inputs each piece of the correction data generated in operation S101 to the corresponding correction model and determines the classification of each piece of the correction data based on the output value of the correction model (operation S103).

Next, the determination apparatus 10 performs density-based clustering based on the determination results in operation S103 to label the correction data and uses the labels as the ground truths to calculate the accuracy of the correction model based on the determination results (operation S104). Operation S103 is executed for each correction plan.

Next, for each correction plan, the determination apparatus 10 calculates the fairness score of the correction model based on the determination results in operation S103 (operation S105). The calculation of the accuracy of the correction model in operation S104 and the calculation of the fairness score in operation S105 may be executed in inverse order or the calculation in operation S104 and the calculation in S105 may be executed in parallel.

Next, for each correction plan, the determination apparatus 10 calculates the model influence score of the correction model by using the variance value and the contribution degree rank of the correction data (operation S106). A flow of the calculation of the model influence score executed in operation S106 is described in more detail with reference to FIG. 13.

FIG. 13 is a flowchart illustrating an example of a flow of a model influence score calculation process according to the present embodiment. First, as illustrated in FIG. 13, for each correction plan, the determination apparatus 10 calculates the variance value based on the difference amount between the corresponding correction data and the input data (operation S201).

Next, for each correction plan, the determination apparatus 10 calculates the processing intensity based on the difference amount between the corresponding correction data and the input data, thereby identifying the attributes strongly processed with the processing intensity larger than or equal to a certain value (operation S202). The attributes processed with the processing intensity larger than or equal to a certain value may be, for example, a predetermined number of the attributes, extracted in descending order, processed with the processing intensity larger than or equal to a predetermined threshold.

Next, for each correction plan, the determination apparatus 10 calculates the model contribution degree of the attributes identified in operation S202 (operation S203).

Next, for each correction plan, the determination apparatus 10 calculates the contribution degree rank based on the model contribution degree calculated in operation S203 (operation S204).

Next, for each correction plan, the determination apparatus 10 calculates the model influence score based on the variance value calculated in operation S201 and the contribution degree rank calculated in operation S204 (operation S205). After operation S205 has been executed, the model influence score calculation process illustrated in FIG. 13 ends, and the processing proceeds to operation S107 of FIG. 12.

Next, the determination apparatus 10 selects the correction plan to be applied to the operation model based on the accuracy calculated in operation S104, the fairness score calculated in operation S105, and the model influence score calculated in operation S106 (operation S107). In selecting the correction plan, for example, a correction plan with the prediction accuracy, the fairness score, and the model influence score exceeding those of the operation model most may be selected. Alternatively, the determination apparatus 10 may present, to the user, the prediction accuracy, the fairness score, and the model influence score of each correction plan together with the prediction accuracy and the fairness score of the operation model to allow the user to select the single correction plan.

Next, the determination apparatus 10 updates the operation model by copying the correction model corresponding to the correction plan selected in operation S107 and replacing the operation model with the correction model (operation S108). In so doing, for example, the determination apparatus 10 may copy the correction filter corresponding to the correction plan selected in operation S107 and apply the correction filter so as to convert the input data to the operation model into the correction data by using the correction filter. Although the determination process illustrated in FIG. 12 ends in operation S108, for example, the process is repeated from operation S101 by using the correction model selected in operation S107 in inputting the input data to the operation model.

[Effects]

As described above, the determination apparatus 10 generates a second machine learning model by updating a first machine learning model based on a second plurality of pieces of data obtained by processing a first plurality of pieces of data based on a bias of the first plurality of pieces of data with reference to at least one first attribute out of a plurality of attributes, obtains prediction results by inputting, to the second machine learning model, a fourth plurality of pieces of data obtained by processing a third plurality of pieces of data based on a bias of the third plurality of pieces of data with reference to the at least one first attribute, determines respective ground truths of the fourth plurality of pieces of data by clustering respective features of the fourth plurality of pieces of data determined based on a parameter of the first machine learning model, determines accuracy of the second machine learning model based on the prediction results and the ground truths, identifies, based on a difference between the first plurality of pieces of data and the second plurality of pieces of data, the at least one first attribute, out of the plurality of attributes, processed with a processing amount which is larger than or equal to a predetermined threshold, identifies a magnitude of contribution of the at least one first attribute to an inference result in a case where data is input and the second machine learning model performs inference, and determines, based on the magnitude of the contribution, an influence degree in a case where the second machine learning model is trained by using the second plurality of pieces of data.

As described above, the determination apparatus 10 compares the ground truths obtained by clustering the features of the operation model with the prediction results of the correction model and determines the influence degree of the training based on the model contribution degree of the attribute processed with a large processing amount. Thus, the determination apparatus 10 may indicate the accuracy influence on the machine learning model due to the fairness correction process.

The determination apparatus 10 obtains the second plurality of pieces of data by converting, in accordance with a first rule, at least one of features and the ground truths included in the first plurality of pieces of data.

Thus, the determination apparatus 10 may correct the fairness with respect to the machine learning model.

The following process executed by the determination apparatus 10 is included: generating, based on the second plurality of pieces of data obtained by converting the first plurality of pieces of data in accordance with a plurality of the first rules, a plurality of the second machine learning models by updating the first machine learning model in accordance with the respective first rules. The determination apparatus 10 selects one of the second machine learning models among the plurality of second machine learning models based on a predetermined condition.

Thus, the determination apparatus 10 may more appropriately correct the fairness while considering degradation of prediction accuracy of the machine learning model.

The process of the selecting of the one of the second machine learning models executed by the determination apparatus 10 includes a process of selecting the one of the second machine learning models based on a fairness score, the accuracy of the second machine learning model, and the influence degree of the second plurality of pieces of data for each first rule.

Thus, the determination apparatus 10 may more appropriately correct the fairness while considering the degradation of the prediction accuracy of the machine learning model and the influence degree in a case where the machine learning model is trained by using correction data.

The determination apparatus 10 outputs a graph in which the fairness score of the second plurality of pieces of data, the accuracy of the second machine learning model, and the influence degree are set as axes.

Thus, the determination apparatus 10 may present to a user the prediction accuracy of the machine learning model and the fairness score to correct more appropriately the fairness while considering the degradation of the prediction accuracy of the machine learning model and the influence degree in the case where the machine learning model is trained by using the correction data.

The at least one first attribute includes a plurality of first attributes respectively processed with a plurality of the processing amounts. The process of identifying the at least one first attribute executed by the determination apparatus 10 includes a process of identifying, based on the difference between the first plurality of pieces of data and the second plurality of pieces of data, a predetermined number of the plurality of first attributes, out of the plurality of attributes, processed with the processing amounts larger than or equal to the predetermined threshold in descending order.

Thus, the determination apparatus 10 may indicate influence on the machine learning model due to a fairness correction only for the attributes respectively processed with larger processing amounts.

[System]

Unless otherwise specified, processing procedures, control procedures, specific names, and information including various types of data and parameters described in the above description or the drawings may be arbitrarily changed. The specific examples, distributions, numerical values, and so forth described in the embodiment example are merely exemplary and may be arbitrarily changed.

The specific form of distribution or integration of the elements included in the determination apparatus 10 is not limited to that illustrated in the drawings. For example, the classification unit 12 of the determination apparatus 10 may be distributed among a plurality of processing units, or the correction unit 13 and the generation unit 14 of the determination apparatus 10 may be integrated into a single processing unit. For example, all or a subset of the components may be functionally or physically distributed or integrated in arbitrary units depending on various types of loads, usage states, or the like. All or an arbitrary subset of the processing functions performed by the apparatus may be realized by a central processing unit (CPU) and a program analyzed and executed by the CPU or may be realized by hardware using wired logic.

Figure 14:
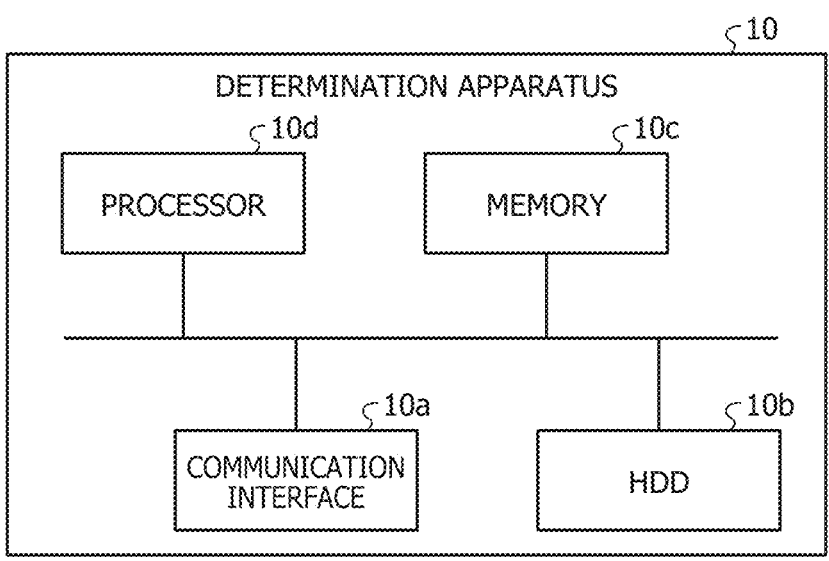
FIG. 14 is a diagram illustrating a hardware configuration example of the determination apparatus according to the present embodiment.

FIG. 14 is a diagram illustrating a hardware configuration example of the determination apparatus 10 according to the present embodiment. Although FIG. 14 illustrates the hardware configuration example using the determination apparatus 10 as an example, the classification device 4 illustrated in FIG. 5 may also employ a similar hardware configuration to that of the determination apparatus 10. As illustrated in FIG. 14, the determination apparatus 10 includes a communication interface 10a, a hard disk drive (HDD) 10b, a memory 10c, and a processor 10d. The components illustrated in FIG. 14 are coupled to each other by a bus or the like.

The communication interface 10a is a network interface card or the like and communicates with an other information processing apparatus. The HDD 10b stores, for example, the program and data that cause the functions illustrated in, for example, FIG. 4 to operate.

Examples of the processor 10d include a CPU, a microprocessor unit (MPU), a graphics processing unit (GPU), and the like. Alternatively, the processor 10d may be realized by an integrated circuit such as an application-specific integrated circuit (ASIC) or a field-programmable gate array (FPGA). For example, the processor 10d reads, from the HDD 10b or the like, a program that executes processes similar to the processes performed by the processing units illustrated in, for example, FIG. 4 and loads the read program onto the memory 10c. Thus, the processor 10d may be operated as a hardware circuit that executes the processes that realize the functions described with reference to FIG. 4 or the like.

The determination apparatus 10 may also realize the functions similar to the functions of the above-described embodiment example by reading the above-described program from a recording medium with a medium reading device and executing the above-described read program. The program described in the embodiment example is not limited to the program to be executed by the determination apparatus 10. For example, the above-described embodiment example may be similarly applied in a case where the other information processing apparatus executes the program or in a case where the other information processing apparatus and the determination apparatus 10 cooperate with each other to execute the program.

The program may be distributed via a network such as the Internet. The program may be recorded in a computer-readable recording medium such as a hard disk, a flexible disk (FD), a compact disc read-only memory (CD-ROM), a magneto-optical (MO) disk, or a Digital Versatile Disc (DVD). The program may be executed by being read from the recording medium by the determination apparatus 10 or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a determination program for causing a computer to execute a process, the process comprising:

processing a first plurality of pieces of data based on a bias of the first plurality of pieces of data with reference to a first attribute, updating a first machine learning model based on a second plurality of pieces of data obtained by the processing of the first plurality of pieces of data, and generating a second machine learning model by the updating of the first machine learning model;

processing a third plurality of pieces of data based on the bias of the third plurality of pieces of data with reference to the first attribute, and obtaining prediction results by inputting, to the second machine learning model, a fourth plurality of pieces of data obtained by the processing of the third plurality of pieces of data;

determining respective ground truths of the fourth plurality of pieces of data by clustering respective features of the fourth plurality of pieces of data, the respective features being determined based on a parameter of the first machine learning model;

determining accuracy of the second machine learning model based on the prediction results and the ground truths;

identifying, based on a difference between the first plurality of pieces of data and the second plurality of pieces of data, the first attribute, out of a plurality of attributes, processed with a processing amount which is larger than or equal to a predetermined threshold;

identifying, in a case where data is input and the second machine learning model performs inference, a magnitude of contribution of the first attribute to a result of the inference; and determining, based on the magnitude of the contribution, an influence degree in a case where the second machine learning model is trained by using the second plurality of pieces of data.

2. The non-transitory computer-readable recording medium according to claim 1, the process further comprising:

obtaining the second plurality of pieces of data by converting, in accordance with a predetermined rule, at least one of the features and the ground truths included in the first plurality of pieces of data.

3. The non-transitory computer-readable recording medium according to claim 2, wherein the generating of the second machine learning model includes generating, based on the second plurality of pieces of data obtained by converting the first plurality of pieces of data in accordance with a plurality of predetermined rule, a plurality of second machine learning models by the updating of the first machine learning model in accordance with each of the plurality of predetermined rules, the plurality of predetermined rules including the predetermined rule and the plurality of second machine learning models including the second machine learning model, and wherein the process further includes selecting the second machine learning model among the plurality of second machine learning models, based on a predetermined condition.

4. The non-transitory computer-readable recording medium according to claim 3, wherein the selecting of the second machine learning model includes selecting the second machine learning model based on a fairness score, the accuracy of the second machine learning model, and the influence degree of the second plurality of pieces of data for each of the plurality of predetermined rules.

5. The non-transitory computer-readable recording medium according to claim 1, the process further comprising:

outputting a graph in which a fairness score of the second plurality of pieces of data, the accuracy of the second machine learning model, and the influence degree are set as axes.

6. The non-transitory computer-readable recording medium according to claim 1, wherein the process identifies, based on the difference between the first plurality of pieces of data and the second plurality of pieces of data, a predetermined number of the plurality of first attributes, out of the plurality of attributes, processed with the processing amounts which is larger than or equal to the predetermined threshold in descending order.

7. A determination apparatus comprising:

a memory; and a processor coupled to the memory and configured to:

process a first plurality of pieces of data based on a bias of the first plurality of pieces of data with reference to a first attribute, update a first machine learning model based on a second plurality of pieces of data obtained by the processing of the first plurality of pieces of data, and generate a second machine learning model by the updating of the first machine learning model;

process a third plurality of pieces of data based on the bias of the third plurality of pieces of data with reference to the first attribute, and obtain prediction results by inputting, to the second machine learning model, a fourth plurality of pieces of data obtained by the processing of the third plurality of pieces of data;

determine respective ground truths of the fourth plurality of pieces of data by clustering respective features of the fourth plurality of pieces of data, the respective features being determined based on a parameter of the first machine learning model;

determine accuracy of the second machine learning model based on the prediction results and the ground truths;

identify, based on a difference between the first plurality of pieces of data and the second plurality of pieces of data, the first attribute, out of a plurality of attributes, processed with a processing amount which is larger than or equal to a predetermined threshold;

identify, in a case where data is input and the second machine learning model performs inference, a magnitude of contribution of the first attribute to a result of the inference; and determine, based on the magnitude of the contribution, an influence degree in a case where the second machine learning model is trained by using the second plurality of pieces of data.

8. The determination apparatus according to claim 7, wherein the processor is further configured to obtain the second plurality of pieces of data by converting, in accordance with a predetermined rule, at least one of the features and the ground truths included in the first plurality of pieces of data.

9. The determination apparatus according to claim 8, wherein the processor is configured to generate, based on the second plurality of pieces of data obtained by converting the first plurality of pieces of data in accordance with a plurality of predetermined rule, a plurality of second machine learning models by the updating of the first machine learning model in accordance with each of the plurality of predetermined rules, the plurality of predetermined rules including the predetermined rule and the plurality of second machine learning models including the second machine learning model, and wherein the processor is further configured to select the second machine learning model among the plurality of second machine learning models, based on a predetermined condition.

10. The determination apparatus according to claim 9, wherein the processor is configured to select the second machine learning model based on a fairness score, the accuracy of the second machine learning model, and the influence degree of the second plurality of pieces of data for each of the plurality of predetermined rules.

11. The determination apparatus according to claim 7, wherein the processor is further configured to output a graph in which a fairness score of the second plurality of pieces of data, the accuracy of the second machine learning model, and the influence degree are set as axes.

12. The determination apparatus according to claim 7, wherein the processor is configured to identify, based on the difference between the first plurality of pieces of data and the second plurality of pieces of data, a predetermined number of the plurality of first attributes, out of the plurality of attributes, processed with the processing amounts which is larger than or equal to the predetermined threshold in descending order.

13. A determination method for causing a computer to execute a process, the process comprising:

processing a first plurality of pieces of data based on a bias of the first plurality of pieces of data with reference to a first attribute, updating a first machine learning model based on a second plurality of pieces of data obtained by the processing of the first plurality of pieces of data, and generating a second machine learning model by the updating of the first machine learning model;

processing a third plurality of pieces of data based on the bias of the third plurality of pieces of data with reference to the first attribute, and obtaining prediction results by inputting, to the second machine learning model, a fourth plurality of pieces of data obtained by the processing of the third plurality of pieces of data;

determining respective ground truths of the fourth plurality of pieces of data by clustering respective features of the fourth plurality of pieces of data, the respective features being determined based on a parameter of the first machine learning model;

determining accuracy of the second machine learning model based on the prediction results and the ground truths;

identifying, based on a difference between the first plurality of pieces of data and the second plurality of pieces of data, the first attribute, out of a plurality of attributes, processed with a processing amount which is larger than or equal to a predetermined threshold;

identifying, in a case where data is input and the second machine learning model performs inference, a magnitude of contribution of the first attribute to a result of the inference; and determining, based on the magnitude of the contribution, an influence degree in a case where the second machine learning model is trained by using the second plurality of pieces of data.

14. The determination method according to claim 13, the process further comprising:

obtaining the second plurality of pieces of data by converting, in accordance with a predetermined rule, at least one of the features and the ground truths included in the first plurality of pieces of data.

15. The determination method according to claim 14, wherein the generating of the second machine learning model includes generating, based on the second plurality of pieces of data obtained by converting the first plurality of pieces of data in accordance with a plurality of predetermined rule, a plurality of second machine learning models by the updating of the first machine learning model in accordance with each of the plurality of predetermined rules, the plurality of predetermined rules including the predetermined rule and the plurality of second machine learning models including the second machine learning model, and wherein the process further includes selecting the second machine learning model among the plurality of second machine learning models, based on a predetermined condition.

16. The determination method according to claim 15, wherein the selecting of the second machine learning model includes selecting the second machine learning model based on a fairness score, the accuracy of the second machine learning model, and the influence degree of the second plurality of pieces of data for each of the plurality of predetermined rules.

17. The determination method according to claim 13, the process further comprising:

outputting a graph in which a fairness score of the second plurality of pieces of data, the accuracy of the second machine learning model, and the influence degree are set as axes.

18. The determination method according to claim 13, wherein the process identifies, based on the difference between the first plurality of pieces of data and the second plurality of pieces of data, a predetermined number of the plurality of first attributes, out of the plurality of attributes, processed with the processing amounts which is larger than or equal to the predetermined threshold in descending order.

\* \* \* \* \*